Aug. 17, 1954 G. E. CARLSON ET AL 2,686,652
VALVE APPARATUS
Filed Jan. 29, 1951 3 Sheets-Sheet 1
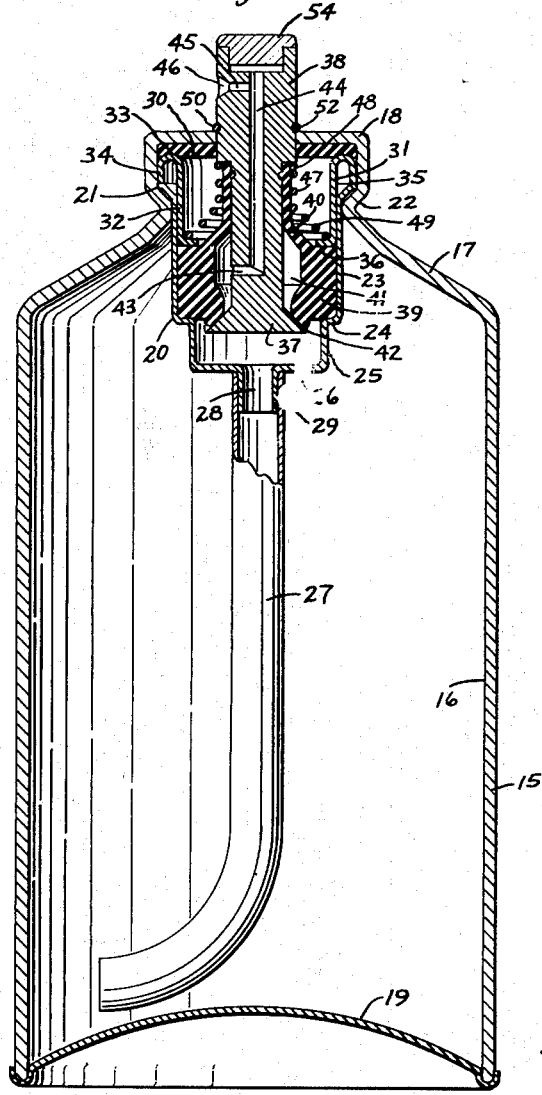
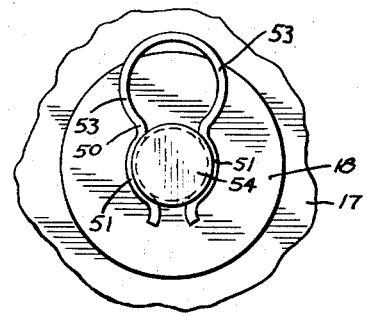
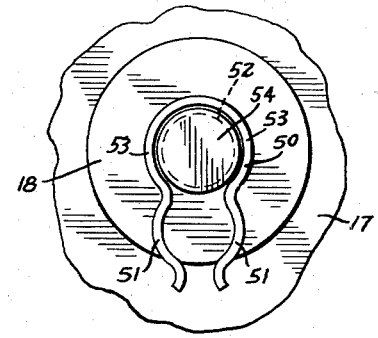
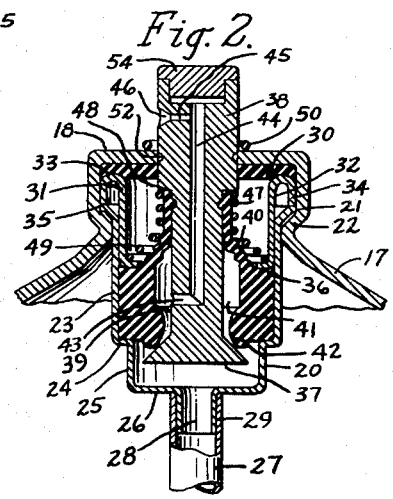
INVENTORS
GEORGE E. CARLSON
J. PARKER BADER
NATHAN B. OWEN
BY
ATTORNEY.

Aug. 17, 1954    G. E. CARLSON ET AL    2,686,652
VALVE APPARATUS
Filed Jan. 29, 1951    3 Sheets-Sheet 2
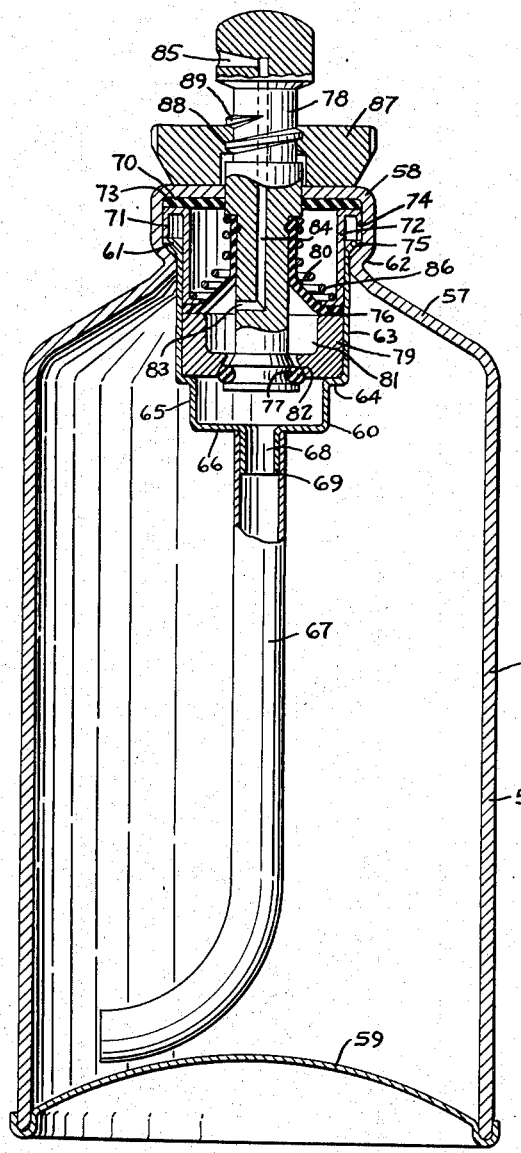
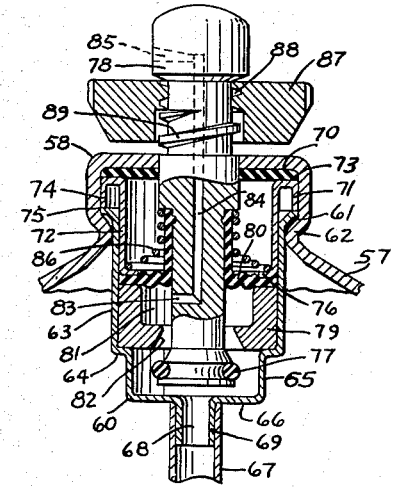
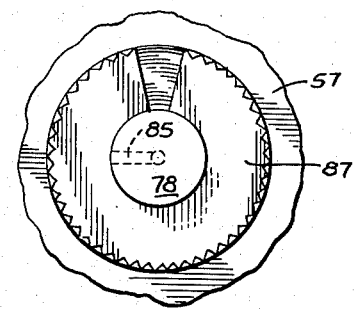
INVENTORS.
GEORGE E. CARLSON
J. PARKER BADER
NATHAN B. OWEN
BY
ATTORNEY.

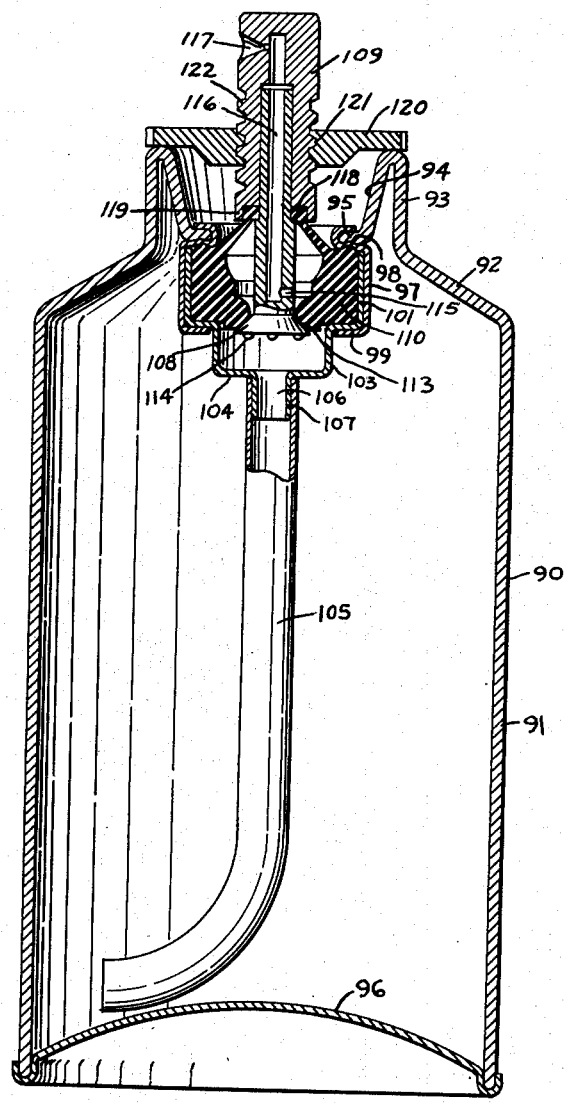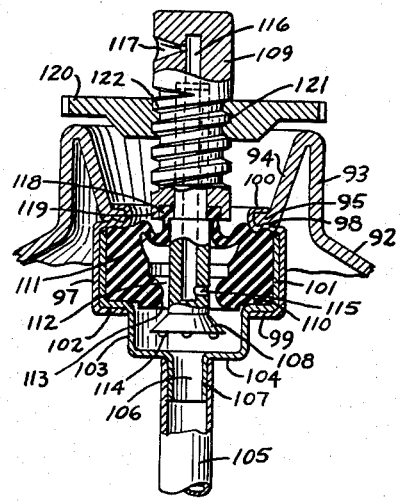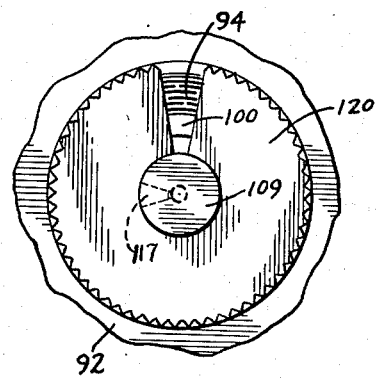

Patented Aug. 17, 1954

2,686,652

UNITED STATES PATENT OFFICE 2,686,652

VALVE APPARATUS

George E. Carlson, St. Louis Park, and J. Parker Bader and Nathan B. Owen, Minneapolis, Minn., assignors to Viking Valve Company, St. Louis Park, Minn., a corporation of Minnesota Application January 29, 1951, Serial No. 208,352

6 Claims. (Cl. 251—353)

The invention herein has relation to a valve apparatus useful for many purposes but devised to be especially useful for controlling flow of fluids under pressure from cans or other containers.

The object of the invention is to provide a so called aerosol valve which will be of new, simple, inexpensive, efficient and improved construction.

In the accompanying drawings forming a part of this specification,

Fig. 1 is a vertical central sectional view, partially in elevation and partially broken away, of a valve apparatus incorporating features and characteristics of the invention;

Fig. 2 is a fragmentary view corresponding with the disclosure of Fig. 1 but showing parts in different positions;

Fig. 3 is a fragmentary top plan view of the valve apparatus of Figs. 1 and 2 disclosing a locking element of said apparatus as when situated to retain a valve of the apparatus in closed condition;

Fig. 4 is a view corresponding generally with the disclosure of Fig. 3 but showing the locking element as when situated to permit operation of said valve to open position;

Fig. 5 is a vertical central sectional view, partially in elevation and partially broken away, of a valve apparatus of modified construction made according to the invention, showing a valve of the apparatus as when closed;

Fig. 6 is a fragmentary view corresponding generally with the disclosure of Fig. 5 but showing the valve of said apparatus as when open;

Fig. 7 is a fragmentary top plan view of the apparatus of Figs. 5 and 6;

Fig. 8 is a vertical central sectional view, partially in elevation and partially broken away, of a valve apparatus of further modified construction incorporating features and characteristics of the invention, showing the valve closed;

Fig. 9 is a fragmentary view corresponding generally with the disclosure of Fig. 8 but showing the valve open; and Fig. 10 is a fragmentary top plan view of the valve apparatus of Figs. 8 and 9.

With respect to Figs. 1 to 4 of the drawings and the numerals of reference thereon, a can 15 there shown may be of ordinary or preferred construction. As disclosed, said can is constituted as a hollow member bounded at its sides by a cylindrical wall 16 which merges at its upper end in an annular wall 17 extending upwardly and inwardly. The upper end of the annular wall 17 is integral with a cap member 18 which, together with said annular wall, bounds the upper end of said hollow member or can, and the lower end of the hollow member or can is covered by an upwardly bowed closure wall 19 of circular outline fitted upon and attached to the lower end of the cylindrical wall 16.

An outer, lower shell 20 of the valve apparatus is constituted as a cup shape member having an upper end flared portion 21 thereof extending downwardly and inwardly and retained within the cap member 18, against the possibility of movement of said portion 21 toward the bottom closure wall 19 of the can, by an annular flange 22 of said can extending downwardly and inwardly from said cap member and integrally joined with the upper circular end of said annular wall 17. A cylindrical intermediate portion 23 of the cup shape member or outer, lower shell 20, immediately below the upper end flared portion 21, merges integrally at its lower end in an interiorly extending annular shoulder 24 in perpendicular relation to said intermediate portion 23, and the interior marginal circular portion of said annular shoulder 24 integrally supports a cylindrical lower portion 25 of said cup shape member or outer, lower shell which is below and concentric with the cylindrical intermediate portion 23. In turn, the lower end of the cylindrical lower portion 25 is integral with a base 26 of the cup shape member or outer, lower shell 20, and a tube 27, for delivering fluid under pressure to a lower portion of the interior of said cup shape member or outer, lower shell, communicates with a lower portion of the interior of the cup shape member or outer, lower shell by way of an opening 28 through the base 26. More explicitly stated, a pipe flange 29 integral with the base 26 is fitted into the upper end of the tube 27. Desirably, the lower end of said tube 27 will terminate in adjacent relation to the bottom wall of the can.

An annular gasket 30 is retained up against the internal surface of the base of the cap member 18 by an inner, upper shell 31, and said inner, upper shell is rigidly retained within said cap member by said annular gasket 30 and the cup shape member or outer, lower shell 20 and in turn rigidly retains the flared portion 21 of said cup shape member or outer, lower shell down against the interior surface of the annular flange 22. A cylindrical intermediate portion 32 of the inner, upper shell 31 is snugly fitted in the cylindrical intermediate portion 23 of the cup shape member or outer, lower shell 20 and merges integrally at its upper end in an outwardly extending annular flange 33 seated against the interior surface of the annular gasket 30. The outer marginal circular portion of said annular flange 33 merges integrally in a downwardly extending ring 34 surrounding and in concentric relation to the cylindrical intermediate portion 32 and having its external surface engaged against the internal surface of the flange of the cap member 18 and its lower edge 35 seated against the upper edge of the flared portion 21 of said outer, lower shell 20. Said cylindrical intermediate portion 32 merges integrally at its lower end in an inwardly extending annular shoulder 36 in perpendicular relation to said intermediate portion and in spaced, parallel relation to the annular shoulder 24. The annular shoulders 36 and 24 are in alined relation longitudinally of the can 15.

A valve member of the apparatus is constituted as a conical valve 37 integrally supported by an elongated cylindrical stem 38 snugly supported for slidable movement longitudinally of the can in the base of the cap member 18 and the annular gasket 30 in spaced, concentric relation to the flange of said cap member.

A valve-seat-providing and sealing-off member of said apparatus is constituted as a hollow body 39 in spaced, surrounding relation to the valve stem 38 and an annular diaphragm 40 integral with said hollow body and in surrounding relation to said valve stem.

The hollow body 39 is fixedly seated in the cylindrical intermediate portion 23 of the cup shape member or outer, lower shell 20 between the annular shoulders 24 and 36, and an annular passageway 41 within said hollow body is contiguous with the stem 38 and the conical valve 37 and the end of the hollow body adjacent said conical valve, but sealed closed adjacent the end of said hollow body opposite the conical valve by said stem 38 and the annular diaphragm 40. Said annular passageway 41 is bounded at its lower end, or end opposite said annular diaphragm 40, by a downwardly and outwardly extending, inwardly facing annular valve seat 42 disposed at the interior side of the conical valve 37, and said conical valve is in spaced relation to the base 26 of the outer, lower shell 20. A first lateral port 43 in the valve stem 38, at the side of the annular valve seat 42 opposite the conical valve 37, is contiguous at its exterior end with the annular passageway 41 and at its interior end with a longitudinal port 44 in said valve stem, and said longitudinal port is contiguous, at an upper portion thereof spaced from the conical valve 37 and disposed exteriorly of the can 15, with the interior end of a second lateral port 45 the exterior end of which opens to an outlet nozzle 46 from said valve stem. A sealing plug for the upper end of the valve stem 38 is denoted 54.

As disclosed, a compression coil spring constitutes a device both for sealing an upper portion of the annular diaphragm 40 about and against an intermediate portion of the valve stem 38 and for resiliently retaining the conical valve 37 in engaged relation with the annular valve seat 42. An upper portion of said annular diaphragm is pressingly surrounded by an upper portion 47 of the compression coil spring thus to be sealed about and against said valve stem directly beneath an annular shoulder 48 thereof, and a lower portion 49 of said compression coil spring is in spaced, surrounding relation to the annular diaphragm and has its lower end seated against an upper surface of the annular shoulder 36 thus to resiliently urge the valve stem 38 to move upwardly and the conical valve 37 to be engaged against the annular valve seat 42. It is to be understood that the compression coil spring can be omitted in an instance when an upper portion of the annular diaphragm 40 is seated against the valve stem in a manner different from that shown and a lower portion of said annular diaphragm itself possesses sufficient resilient power normally to retain the conical valve 37 engaged up against the annular valve seat 42.

A locking element for retaining the conical valve 37 and the annular valve seat 42 in engaged relation against the possibility of accidental removal of said conical valve from said annular valve seat, as when a can having the valve apparatus is being shipped or otherwise handled, is constituted as a resilient clip 50 open at a smaller and closed at a larger side thereof. Oppositely disposed, part-circular elements 51, 51 of the resilient clip 50 are spaced apart a distance slightly less than the diameter of the valve stem 38, and said valve stem has a circular groove 52 in its periphery perpendicular to its axis. The construction and arrangement will be such that the part-circular elements 51, 51 can be situated in the circular groove 52 and engaged against the external surface of the base of the cap member 18 of the can, as in Figs. 1 and 3, to lock the valve stem 38 against longitudinal movement with the conical valve 37 and the annular valve seat 42 in engagement. When it is desired that the valve stem 38 be released so that it may be longitudinally slid inwardly, the resilient clip 50 can either be removed from the valve stem, or slid to position, as in Figs. 2 and 4, where the part-circular elements 53, 53, spaced at farther distance apart, will be disposed clear of the circular groove 52 exteriorly thereof.

When it is desired to dispense fluid under pressure from the can 15, the valve stem 38 will be manually depressed against resilient action of the compression coil spring thus to remove the conical valve 37 from the annular valve seat 42. Upon release of said valve stem, said compression coil spring immediately will react to return said conical valve into engaged relation with said annular valve seat. When the valve is in open condition, flow from the can 15 will be by way of the tube 27, the outer, lower shell 20, the annular passageway 41, the first lateral port 43, the longitudinal port 44 and the second lateral port 45 to the outlet nozzle 46.

The only parts of the valve apparatus with which fluid under pressure being dispensed can come in contact are the tube 27, the outer, lower shell 20, the hollow body 39 and the annular diaphragm 40 of the valve-seat-providing and sealing-off member, and the valve member constituted as the conical valve 37 and the elongated valve stem 38. Desirably, all of the parts of the apparatus to be contacted by fluid under pressure will be of non-metallic material, thus to insure that there will be no occurrence of electrolytic action. As shown, the member comprising the hollow body 39 and the annular diaphragm 40 is of molded rubber, and the tube 27, the outer, lower shell 20 and the member comprising the conical valve 37 and the stem 38 are of plastic material.

Referring to Figs. 5 to 7 of the drawings, 55 denotes a can of construction similar to that of the can 15. A cylindrical wall 56 of the can 55 merges at its upper end in an annular wall 57 which extends upwardly and inwardly. The upper end of the annular wall 57 is connected, through the medium of a downwardly and inwardly extending annular flange 62, with a cap member 58. The lower end of the can 55 is covered by a closure wall 59.

An outer, lower shell 60, equivalent to the outer, lower shell 20, is a cup shape member having an upper end flared portion 61 thereof extending downwardly and inwardly and retained within the cap member 58 by the annual flange 62 of the can. A cylindrical intermediate portion 63 of the outer, lower shell 60, below the flared portion 61, merges at its lower end in an interiorly extending annular shoulder 64 in perpendicular relation to said intermediate portion 63. The interior marginal portion of said annular shoulder 64 supports a cylindrical lower portion 65 of said outer, lower shell 60 below and concentric with the intermediate portion 63. A base 66 of the outer, lower shell 60 is integral with the lower end of the cylindrical lower portion 65 of said outer, lower shell, and a tube 67 communicates with a lower portion of the interior of the outer, lower shell 60 by way of an opening 68 through the base 66 and a pipe flange 69 upon said base and in the adjacent end portion of said tube.

An annular gasket 70 is retained up against the internal surface of the base of the cap member 58 by an inner, upper shell 71 itself rigidly retained within said cap member by the annular gasket 70 and the outer, lower shell 60 and rigidly retaining the flange portion 61 of said outer, lower shell 60 down against the interior surface of the annular flange 62. A cylindrical intermediate portion 72 of the inner, upper shell 71 is fitted in the cylindrical intermediate portion 63 of the outer, lower shell 60 and merges at its upper end in an outwardly extending annular flange 73 seated against the interior surface of the annular gasket 70. The outer marginal portion of the annular flange 73 merges in a downwardly extending ring 74 concentrically surrounding the cylindrical intermediate portion 72 and having its external surface engaged against the internal surface of the flange of the cap member 58 and its lower edge 75 seated against the upper edge of the flared portion 61 of the outer, lower shell 60. The cylindrical intermediate portion 72 merges at its lower end in an inwardly extending annular shoulder 76 in perpendicular relation to said intermediate portion and in spaced, parallel relation to the annular shoulder 64. The annular shoulders 76 and 64 are alined longitudinally of the can 55.

A valve member is constituted as an element with annular groove supporting an O-ring valve 77 and including an elongated cylindrical stem 78 integral with said element and snugly supported for slidable movement longitudinally of the can in the base of the cap member 58 and the annular gasket 70 in spaced, concentric relation to the flange of the cap member.

A valve-seat-providing member is constituted as a hollow body 79 in spaced, surrounding relation to the valve stem 78, and a sealing-off member is constituted as an annular diaphragm 80 in surrounding relation to said valve stem.

The hollow body 79 is fixedly seated in the cylindrical intermediate portion 63 of the outer, lower shell 60 between the annular shoulder 64 and an annular lower edge portion of the annular diaphragm 80 engaged against the lower surface of the annular shoulder 76. An annular passageway 81 within the hollow body 79 is contiguous with the stem 78 and the O-ring valve 77 and the end of said hollow body adjacent said O-ring valve, but sealed closed adjacent the end of the hollow body opposite said O-ring valve by said stem 78 and the annular diaphragm 80. Said annular passageway 81 is bounded at its lower end, or end opposite said annular diaphragm 80, by a downwardly and outwardly extending, inwardly facing annular valve seat 82 disposed at the interior side of the O-ring valve 77. The element with annular groove supporting said O-ring valve is in spaced relation to the base 66 of the outer, lower shell 60. A lateral port 83 in the valve stem 78, at the side of the annular valve seat 82 opposite the O-ring valve 77, is contiguous at its exterior end with the passageway 81 and at its interior end with a longitudinal port 84 in said valve stem, and said longitudinal port is contiguous, at a location exterior of the can above its cap member, with the interior end of an outlet nozzle 85 from said valve stem. The upper end portion of the valve stem 78 is enlarged in the disclosure as made.

A compression coil spring 86 constitutes a device both for sealing an upper portion of the annular diaphragm 80 about and against an intermediate portion of the valve stem 78 and for resiliently retaining the O-ring valve 77 in engaged relation with the annular valve seat 82. An upper portion of said annular diaphragm is closely surrounded by an upper portion of the compression coil spring 86 and thus sealed about and against the valve stem 78, and a lower portion of said compression coil spring is in spaced, surrounding relation to the annular diaphragm 80 and has its lower end seated against the annular shoulder 76 thus to resiliently urge the valve stem 78 to move the O-ring valve 77 into engaged relation with the annular valve seat 82.

A locking element for retaining the O-ring valve 77 and the annular valve seat 82 in engaged relation is constituted as a flexible split nut 87 having an internal thread 88 engaged with an external thread 89 upon an upper portion of the valve stem 78 above the cap member 58 of the can 55. The flexible split nut 87 will be of construction to be capable of being spread to be fitted upon the valve stem. The O-ring valve can be retained against the annular valve seat merely by turning the flexible split nut 87 down against the external surface of the base of the cap member 58 of the can 55, as in Fig. 5 of the drawings. When it is desired that the valve stem 78 be released in order that it can be manually actuated, thus to remove the O-ring valve from the annular valve seat, the flexible split nut 87 will be turned to position, as in Fig. 6, where in spaced relation to the base of the cap member of the can.

The valve apparatus of Figs. 5 to 7 is operative substantially in the manner as set forth in connection with the disclosure of Figs. 1 and 2. When the O-ring valve 77 is in spaced relation to the annular valve seat 82, as in Fig. 6, flow from the can 55 will be by way of the tube 67, the outer, lower shell 60, the annular passageway 81 and the ports 83 and 84 to the outlet nozzle 85.

The parts of the valve apparatus of Figs. 5 to 7 with which fluid under pressure can come in contact are the tube 67, the outer, lower shell 60, the hollow body 79, the annular diaphragm 80, and the valve member including the O-ring valve 77 and the elongated valve stem 78. As disclosed, the O-ring valve 77 and the annular diaphragm 80 are of molded rubber, and the tube 67, the outer, lower shell 60 and the member providing the stem 78 and the support for the O-ring valve 77 are of plastic material.

Referring to Figs. 8 to 10, a can 90 there shown is constituted as a hollow member bounded at its sides by a cylindrical wall 91 which merges at its upper end in an annular wall 92 extending upwardly and inwardly. The upper end of the annular wall 92 is integral with a cap member constituted as a vertical circular wall 93, extending upwardly from said annular wall 92, and a hollow conical wall 94 integral with the upper edge of the circular wall 93 and extending downwardly and inwardly therefrom. An inwardly extending annular flange 95 upon the lower inner edge of the hollow conical wall 94 is substantially perpendicular to the longitudinal axis of the can 90. The lower end of said can is covered by a closure wall 96.

An outer, upper shell of the valve apparatus of Figs. 8 to 10 is constituted as an annular element including a cylindrical intermediate portion 97, concentric with the cylindrical wall 91, having spaced, interiorly extending upper and lower annular shoulders 98 and 99 thereon in substantially perpendicular relation to said intermediate portion 97. The interior marginal edge of the upper annular shoulder 98 is integral with an exteriorly extending annular flange 100 above and in spaced relation to said upper annular shoulder 98. As will be clear from Figs. 8 and 9, the annular shoulder 98 and the annular flange 100 are secured against the lower and upper surfaces, respectively, of annular flange 95 to cause the outer, upper shell to be fixedly supported within the can.

An inner, lower shell includes a cylindrical upper portion 101 having its external surface engaged against the internal surface of the cylindrical portion 97 of the outer, upper shell and its upper edge contiguous with the lower, inner surface of the upper annular shoulder 98. The cylindrical upper portion 101 merges at its lower end in an interiorly extending annular shoulder 102 in perpendicular relation to said upper portion 101, and the interior marginal portion of said annular shoulder 102 supports a cylindrical lower portion 103 of said inner, lower shell below and concentric with said cylindrical upper portion 101. The lower end of the cylindrical lower portion 103 is integral with a base 104 of the inner, lower shell, and a tube 105 communicates with a lower portion of said inner, lower shell by way of an opening 106 through the base 104 and a pipe flange 107 upon said base and in the adjacent end portion of the tube 105.

A valve member is constituted as a conical valve 108 integral with an elongated cylindrical stem 109 disposed in spaced, concentric relation to the cylindrical intermediate portion 97 of the outer, upper shell and the cylindrical upper portion 101 of the inner, lower shell.

A valve-seat-providing and sealing-off member is constituted as a hollow body 110 in spaced, surrounding relation to the valve stem 109 and an annular diaphragm 111 integral with said hollow body 110 and in surrounding relation to said valve stem.

The hollow body 110 is fixedly seated in the annular element of the outer, upper shell between the annular shoulders 98 and 102 and against the internal surface of the cylindrical upper portion 101 of the inner, lower shell. An annular passageway 112 within the hollow body 110 is contiguous with the stem 109 and the conical valve 108 and the end of said hollow body adjacent said conical valve. Said stem and the annular diaphragm 111 seal the annular passageway 112 closed adjacent the end of the hollow body 110 opposite said conical valve 108. Said annular passageway 112 is bounded at its lower end, or end opposite said annular diaphragm 111, by a downwardly and outwardly extending, inwardly facing annular valve seat 113 disposed at the interior side of the conical valve 108. Said conical valve normally is in spaced relation to the base 104 of the inner, lower shell, and spacing elements 114 on the lower end of the valve member are for precluding the possibility of actuation of the conical valve toward said base 104 to the closed condition of the opening 106. A lateral port 115 in the valve stem 109 above the conical valve 108 is contiguous at its exterior end with the annular passageway 112 and at its interior end with a longitudinal port 116 in said valve stem, and said longitudinal port is contiguous, at a location above the can, with the interior end of an outlet nozzle 117 from said valve stem. As shown, the annular diaphragm 111 includes an upper portion 118 snugly seated in a downwardly facing annular groove 119 in the valve stem 109 thus to cause the annular passageway 112 to be closed at its upper end. Said annular diaphragm 111 will be constituted as a resilient member possessing sufficient power normally to retain the conical valve 108 engaged against the annular valve seat 113.

A locking element for retaining the conical valve 108 and the annular valve seat 113 in engaged relation is constituted as a flexible split nut 120 having an internal thread 121 engaged with an external thread 122 upon an upper portion of the valve stem 109 above the annular diaphragm 111. The flexible split nut 120 will be spread thus to be fitted upon the valve stem 109. The conical valve 108 and the annular valve seat 113 can be retained in engagement by turning the flexible split nut 120 down against the cap member of the can, as it is shown in Fig. 8, and the valve stem 109 can be released to be movable vertically relative to the can by turning said flexible split nut to position, as in Fig. 9, where in spaced relation to the cap member of said can.

The conical valve 108 can be unseated merely by depressing the valve stem 109 against resilient action of the annular diaphragm 111, and upon release of said valve stem, said annular diaphragm 111 will immediately react to cause said conical valve to be seated against the annular valve seat. When the conical valve 108 and the annular valve seat 113 are in separated relation, flow from the can 90 will be by way of the tube 105, the inner, lower shell, the annular passageway 112 and the ports 115 and 116 to the outlet nozzle 117.

Fluid under pressure in and dispensed from the can 90 will come in contact with the tube 105, the outer, upper and inner, lower shells of the valve apparatus, the hollow body 110, the annular diaphragm 111 and the valve member including the conical valve 108, the stem 109 and the spacing elements 114. As shown, the hollow body 110 and the annular diaphragm 111 are of molded rubber, and the tube 105, the outer, upper and inner, lower shells and the valve member are of non-metallic material.

What is claimed is:

1. A valve apparatus for a container having a constricted neck, said apparatus comprising an open bottomed cup-shaped member having an upper portion adapted to be secured in the container neck and having in its lower portion a pair of axially spaced inwardly directed flanges, hollow resilient means clamped between said flanges comprising a radially inwardly thickened lower portion having an axial opening in its bottom end forming a valve seat communicating with the opening in the bottom of the cup-shaped member and having a relatively thin diaphragm portion projecting radially inwardly and upwardly from its upper portion and extending above the upper edge of said cup-shaped member, and a valve stem mounted within the hollow of said resilient means having the diaphragm portion thereof embracing its intermediate portion in sealed relation and terminating at its bottom in a radial enlargement constituting a valve cooperating with said seat, said stem having a bore communicating with the hollow of said resilient means above said enlargement and said enlargement being normally held engaged with said seat by the resilience of the diaphragm portion of the resilient means and being depressible with flexing of the diaphragm portion to unseat the valve.

2. The combination claimed in claim 1, including a downwardly facing shoulder formed on the valve stem above its intermediate portion and a coil spring compressed between said shoulder and the upper of the axially spaced flanges of the cup-shaped member for assisting by its tension in urging the valve against the seat.

3. The combination claimed in claim 1, in which the hollow resilient means is a one-piece integral body.

4. The combination claimed in claim 1, in which the inwardly thickened lower portion and the diaphragm portion of the resilient means are separate elements clamped together in sealed relation between the axially spaced flanges of the cup-shaped member.

5. The combination claimed in claim 1, in which the opening in the bottom of the cup-shaped member is defined by a third radially inwardly directed flange axially spaced below said pair of axially spaced flanges, said third flange serving as a stop for limiting inward movement of the valve.

6. A valve apparatus for a container having a constricted neck providing an inwardly directed shoulder, said apparatus comprising an open bottomed cup-shaped member having at its upper edge an outwardly turned flange adapted to be seated on said inwardly directed shoulder of the container neck and having below said upper edge a pair of axially spaced inwardly directed flanges, hollow resilient means clamped between said flanges comprising a radially inwardly thickened lower portion having an axial opening in its bottom end forming a valve seat communicating with the opening in the bottom of the cup-shaped member and having a relatively thin diaphragm portion projecting radially inwardly and upwardly from its upper portion and extending above the upper edge of said cup-shaped member, and a valve stem mounted within the hollow of said resilient means having the diaphragm portion thereof embracing its intermediate portion in sealed relation and terminating at its bottom in a radial enlargement constituting a valve cooperating with said seat, said stem having a bore communicating with the hollow of said resilient means above said enlargement and said enlargement being normally held engaged with said seat by the resilience of the diaphragm portion of the resilient means and being depressible with flexing of the diaphragm portion to unseat the valve.

References Cited in the file of this patent

UNITED STATES PATENTS

| Number | Name | Date |
| --- | --- | --- |
| 116,433 | Glover | June 27, 1871 |
| 358,219 | Peter | Feb. 22, 1887 |
| 420,155 | Hageman | Jan. 28, 1890 |
| 1,601,961 | Allen | Oct. 5, 1926 |
| 1,799,143 | Bailey | Apr. 7, 1931 |
| 1,869,049 | Card | July 26, 1932 |
| 2,004,018 | Strauss | June 4, 1935 |
| 2,441,094 | Alderfer | May 4, 1948 |
| 2,504,276 | Olsen | Apr. 18, 1950 |
| 2,543,850 | Henricson | Mar. 6, 1951 |
| 2,565,954 | Dey | Aug. 28, 1951 |
| 2,612,293 | Michel | Sept. 30, 1952 |